(12) United States Patent
Chabassier

(10) Patent No.: US 6,912,835 B1
(45) Date of Patent: Jul. 5, 2005

(54) KNIFE SELECTING ARRANGEMENT OF CROP CUTTING DEVICE FOR USE WITH AGRICULTURAL MACHINES HAVING A PICK-UP

(75) Inventor: Aurelien Chabassier, Broye les Loups (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/877,273

(22) Filed: Jun. 25, 2004

(51) Int. Cl.$^7$ .............................................. A01D 34/42
(52) U.S. Cl. ....................................... 56/504; 241/243
(58) Field of Search ..................... 241/243; 460/112; 56/504, 505, 341, 115

(56) References Cited

U.S. PATENT DOCUMENTS

| | | | |
|---|---|---|---|
| 5,974,776 A * | 11/1999 | Prellwitz | ..................... 56/504 |
| 6,050,510 A | 4/2000 | Bonnewitz | |
| 6,394,893 B1 | 5/2002 | Scholz et al. | |
| 6,594,983 B1 | 7/2003 | Krone et al. | |
| 6,769,239 B1 * | 8/2004 | Webb | ........................... 56/341 |

FOREIGN PATENT DOCUMENTS

DE 43 02 199 1/1993

* cited by examiner

Primary Examiner—Árpád Fábián Kovács

(57) ABSTRACT

A cutting device is adapted for cooperating with a tined rotor that receives crop delivered by a pick-up. A selector mechanism is provided for selecting the number of effective knives for reducing the crop conveyed across the knife bed. This selector includes a selector rotor rotatably mounted to a pivoted lever arrangement which may be raised to a non-use position when all of the knives are to be used for crop reduction. The selector rotor includes four rows of different arrangements of selector tabs spaced equally about the axis of the rotor. Lowering the lever places the rotor in a working location where a selected one of the four different rows of selector tabs is positioned for blocking a desired number of safety trip devices, which are associated one each with each cutter knife, in a retracted position where it is prevented from interacting with its associated knife, whereby the knife remains in a non-working position.

5 Claims, 9 Drawing Sheets

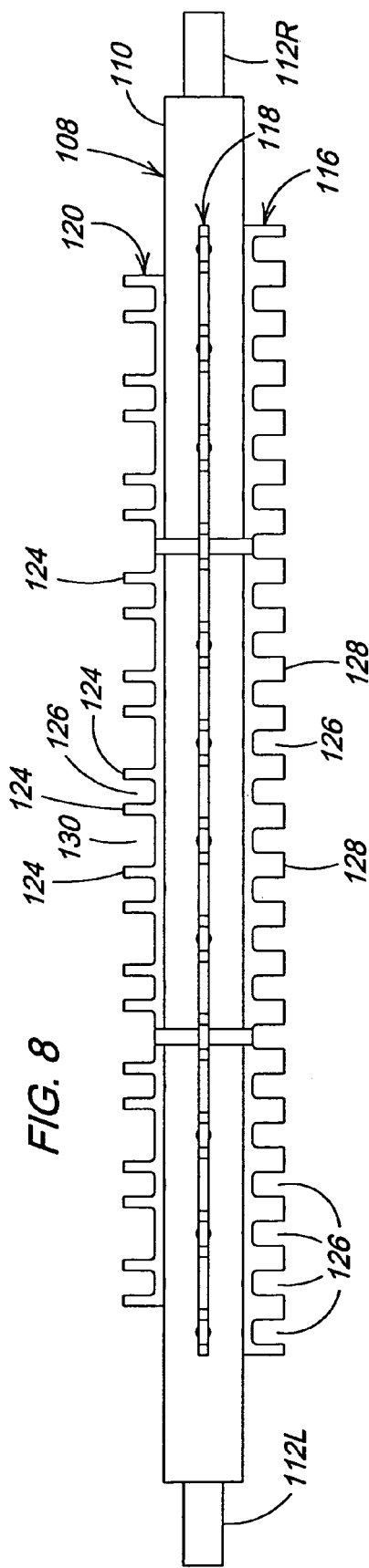
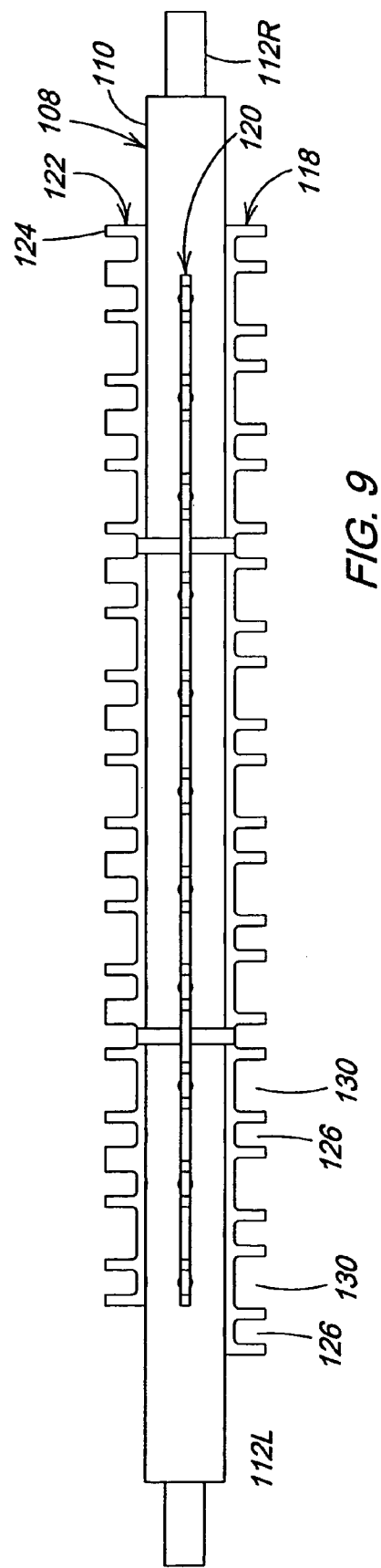
FIG. 8
FIG. 9

KNIFE SELECTING ARRANGEMENT OF CROP CUTTING DEVICE FOR USE WITH AGRICULTURAL MACHINES HAVING A PICK-UP

FIELD OF THE INVENTION

The present invention relates to a crop cutting device for use with agricultural crop harvesting machines, and, more specifically, relates to a knife selecting arrangement for such a crop cutting device.

BACKGROUND OF THE INVENTION

It is known to provide agricultural crop harvesting machines, of the type which pick up crop from a windrow, with a cutting device which reduces the crop for further processing. It is also known to mount each of the knives for individual release or tripping against a biasing force so as to protect them from being damaged from obstacles or crop which produces high loads, and to provide a way of selecting all, none, or various numbers of the available knives for operation so as to vary the amount that the crop is reduced by the active knives.

DE 43 02 199 discloses one way of selecting the number of active cutting knives. However, this cutting device requires each knife to be individually locked out of operation, which is time consuming and is difficult to achieve in the cramped environment where the cutting device is mounted.

U.S. Pat. No. 6,050,510 discloses a way of selecting the number of active cutting knives wherein a plurality of knives can be locked out of operation according to a pre-selected arrangement by pivoting a blocking rod into a desired location and securing it there for blocking a pre-selected arrangement of knives. While this device does permit multiple knives to be blocked out at the same time, the mechanism for achieving this operation is relatively complex and does not act together with the structure for individually biasing the knives to form a compact arrangement.

U.S. Pat. No. 6,394,893 discloses a hydraulically controlled arrangement including individual hydraulic actuators for each of the cutting knives and a hydraulic control circuit arrangement for selecting various arrangements of active knives.

U.S. Pat. No. 6,594,983 discloses cutting blades which are individually associated with trip mechanisms including resiliently biased plates which permit the cutting blades to pivot into a non-working position in response to a pre-selected overload. A support and control member is associated with each cutting blade and is mounted in a rotatable fashion and aligned about an axis parallel to a rotation axis of the associated cutting blade. A control device releases selected support members, thereby allowing all or a number of the cutting blades to rotate into a non-cutting position.

The problem to be addressed by the present invention is that of providing a crop cutting device with a knife-selecting device of a relatively simple design which is easily operable for selecting the number of active knives, without affecting the operation of a safety trip mechanism associated with the knives.

SUMMARY OF THE INVENTION

According to the present invention, there is provided a crop cutting device, for use with an agricultural implement, that is equipped with an improved knife-selecting arrangement.

An object of the invention is to provide a knife-selecting arrangement which is of a simple construction, has the ability to select a desired arrangement of knives from a single setting, and, together with the safety trip arrangement for individually biasing the knives, forms a compact structure.

This and other objects of the invention will be apparent from a reading of the following description together with the appended drawings.

BRIEF DESCRIPTION OF THE DRAWINGS

FIG. 8 is a view showing the central portion of the selector rotor clearly illustrating two sets of selector tabs.

FIG. 9 is a view like FIG. 7 but showing the selector rotor rotated 90° about its axis and illustrating third and fourth sets of selector tabs.

DESCRIPTION OF THE PREFERRED EMBODIMENT

Figure 1:
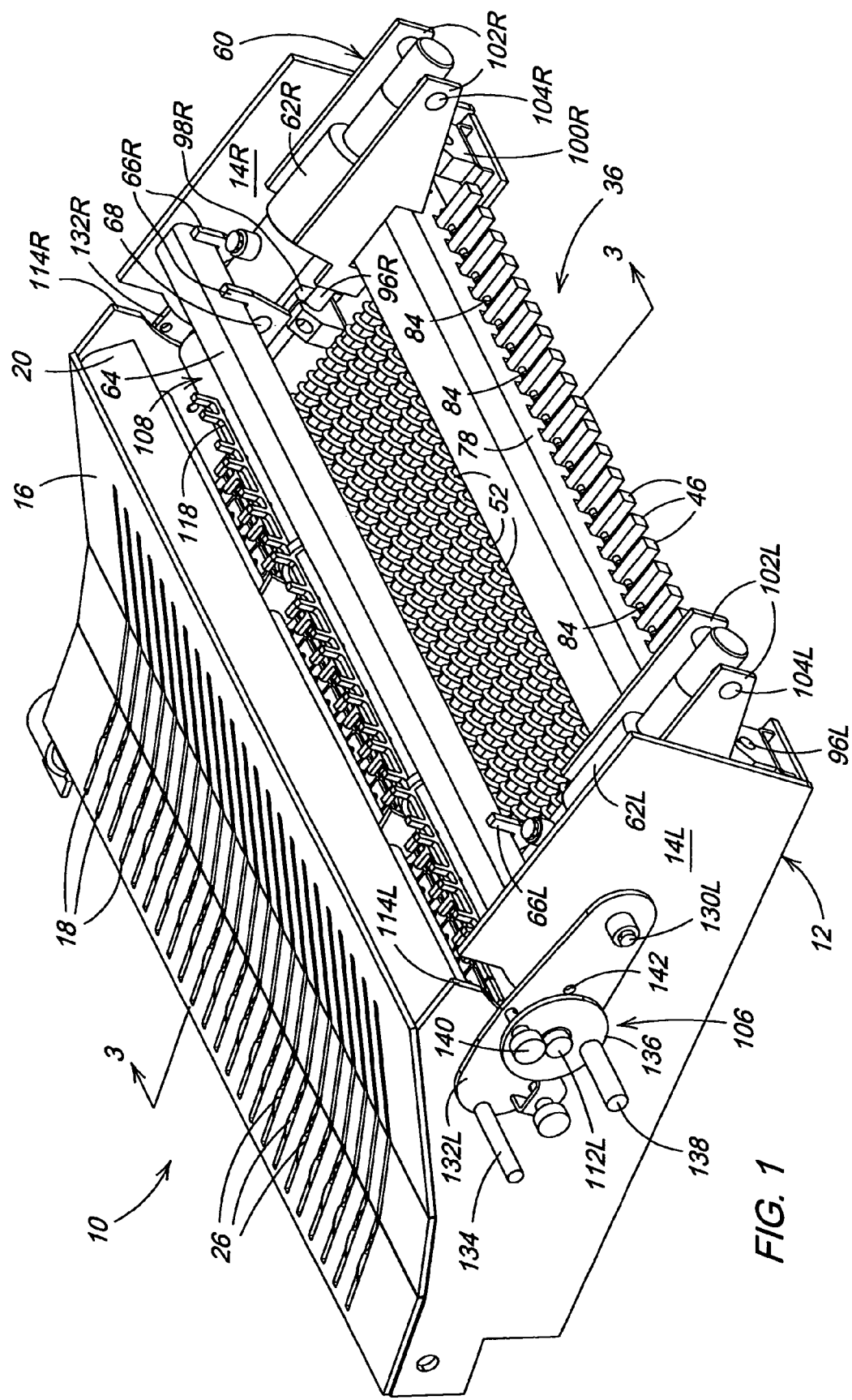
FIG. 1 is a left, top perspective view of the cutting device, with the knife control hydraulic cylinder being extended, with all of the knives being shown in lower, inactive positions.
Figure 2:
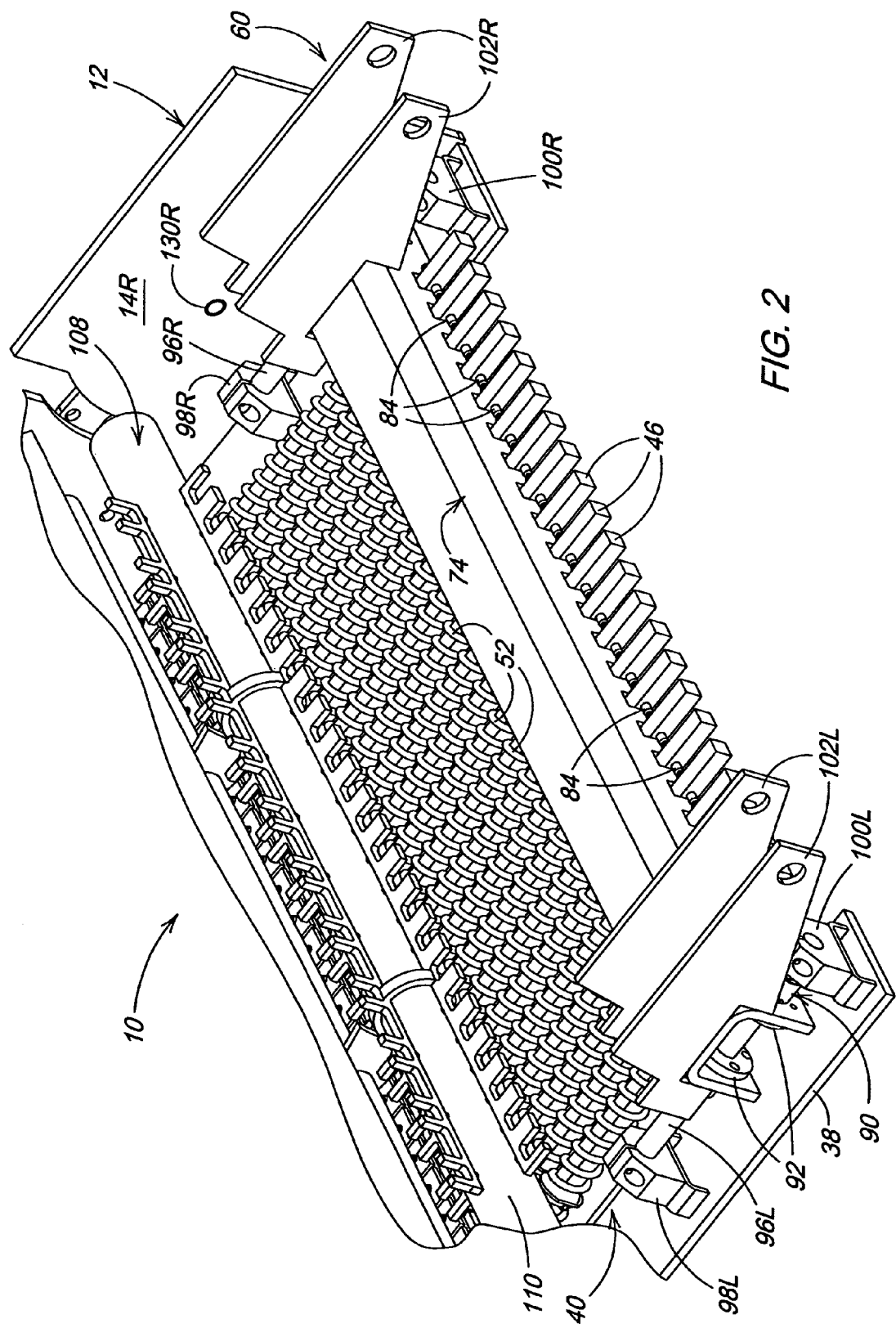
FIG. 2 is a perspective view like FIG. 1 but showing only the portion rearward of the knife bed and omitting the left-hand side wall and hydraulic cylinders so as to reveal the slide support of the knife control mechanism.

Referring now to FIGS. 1 and 2 of the drawings, there is shown a crop cutting device 10 which is adapted for use in conjunction with crop harvesting implements such as large round or square balers or forage harvesters or forage wagons, or any other implement equipped with a crop pick-up for elevating a windrow of crop from the ground and conveying it for being processed further and/or loaded in a container. In these installations, the crop cutting device is located so that picked up crop flows over the top of the cutting device as it is propelled toward further crop processing elements by a crop feed rotor which cooperates with the crop cutting device 10, in a manner described below, so as to reduce the size of the crop material being conveyed.

The crop cutting device 10 includes a support frame 12 comprising identical, right- and left-hand, transversely spaced, vertical side walls 14R and 14L, respectively. Extending between an upper forward section of the side walls 14R and 14L is a formed sheet defining an upwardly and rearwardly inclined knife bed 16 which is provided with a plurality of transversely spaced slots 18. Providing stiffness to the frame 12 is a transverse, horizontal angle member 20 having one leg located beneath, and fixed to, an upper end region of the knife bed 16, and having opposite ends respectively fixed to inner surfaces of the side walls 14R and 14L.

Figure 3:
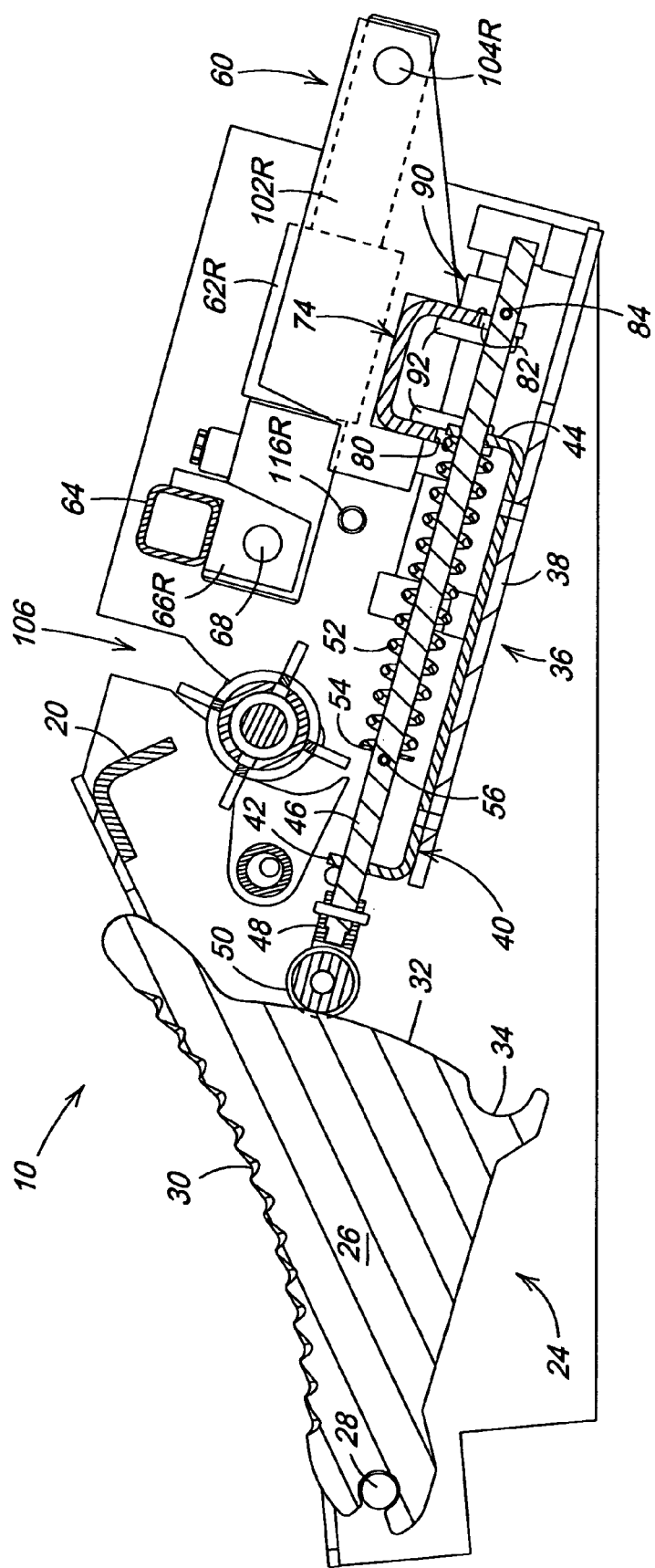
FIG. 3 is a vertical sectional view taken along line 3—3 of FIG. 1, with the selector device being located in a raised inoperative position, and with the hydraulic actuator being extended to establish a condition wherein all of the blades are in lowered, inactive positions.
Figure 4:
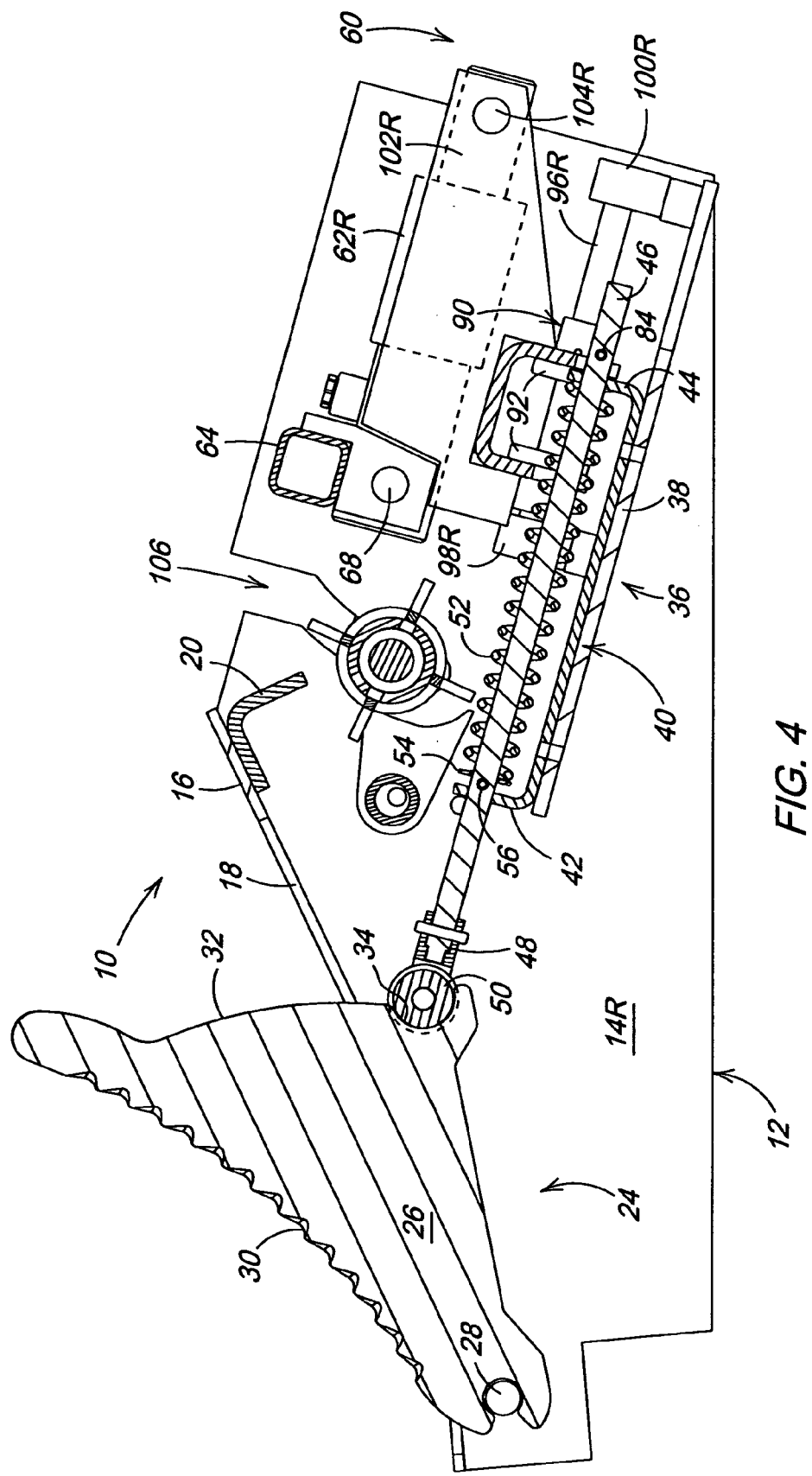
FIG. 4 is a view like that of FIG. 3, but showing the knife control hydraulic cylinder in a retracted position, wherein all of the knives are in a raised, active position.
Figure 5:
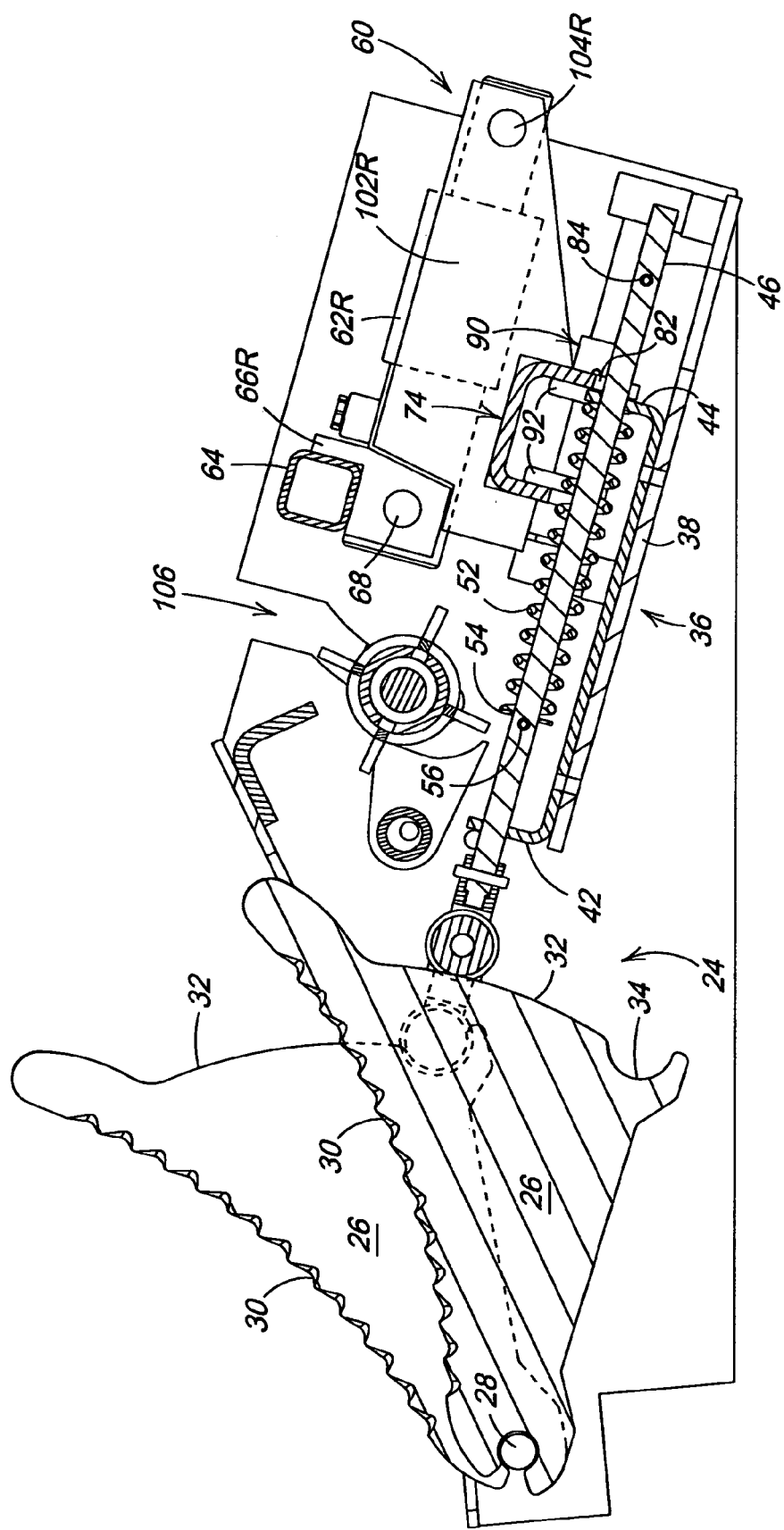
FIG. 5 is a view like FIG. 4, but showing one knife in a lowered, tripped position which it would assume in response to being subject to a pre-selected overload.

Referring now also to FIGS. 3–5, it can be seen that a knife assembly 24 is mounted beneath the knife bed 16. The knife assembly 24 includes a plurality of identical, generally triangular knives 26, which are respectively located within the slots 18. Forward corners of the knives 26 are pivotally mounted to a cylindrical rod 28 that extends through, and is fixed to the side walls 14 at a location just below forward end regions of the slots 18. The knives 26 may individually pivot about the rod 28 between a lowered, non-working or inactive position, wherein a serrated cutting edge 30, which extends between the lower front corner and an upper rear corner of the knife, is located approximately at the level of the knife bed 16, and a raised, working or active position, wherein the cutting edge 30 is angled up and to the rear above the knife bed 16. Each knife 26 has a rear edge defining a cam surface 32 extending between the upper rear corner and a lower rear corner and which terminates at a semi-circular recess 34 located at the lower rear corner.

Provided for permitting the knives 26 to individually move between their working and non-working positions in response to a predetermined overload is a safety trip mechanism 36 including a support plate 38 which extends between and is fixed to the side walls 14R and 14L of the frame 12, and is angled upwardly toward the front from a lower rear corner of the side walls. Mounted to the top of the support plate 38 in fore-and-aft or longitudinal alignment with each of the knives 26 is an elongate U-shaped support bracket 40 having upwardly projecting, front and rear legs 42 and 44, respectively. The legs 42 and 44 contain fore-and-aft aligned apertures which receive an elongate spring support rod 46 for fore-and-aft sliding movement. Mounted to the front of the rod 46 is a roller support member 48 to which a roller 50 is mounted for rotation about a horizontal axis. When the associated blade 46 is in its raised, working position (FIG. 3), the roller 50 is located in the semi-circular recess 34. A coil compression spring 52 is received on the spring support rod 46 between the front and rear legs 42 and 44 of the bracket 36, with a rear end of the spring 52 engaging the rear leg 44 and with a forward end of the spring 52 engaging a washer 54 positioned against roll pin 56 extending cross wise through the support rod 46 at a location just to the rear of the front leg 42 of the support bracket 40 when the roller 50 is located in the recess 34. Thus, it will be appreciated that, when a pre-selected force is exerted on the cutting edge 30 of the knife 26, the spring 52 will yield and permit the roller 50 to move out of the recess 34 so as to permit the knife 26 to pivot downwardly to its non-working position shown in FIG. 3. Once the force which caused the knife 26 to move to its non-working position is removed, the spring 52 will unload and cause the knife 26 to be restored to its working position.

Figure 10:
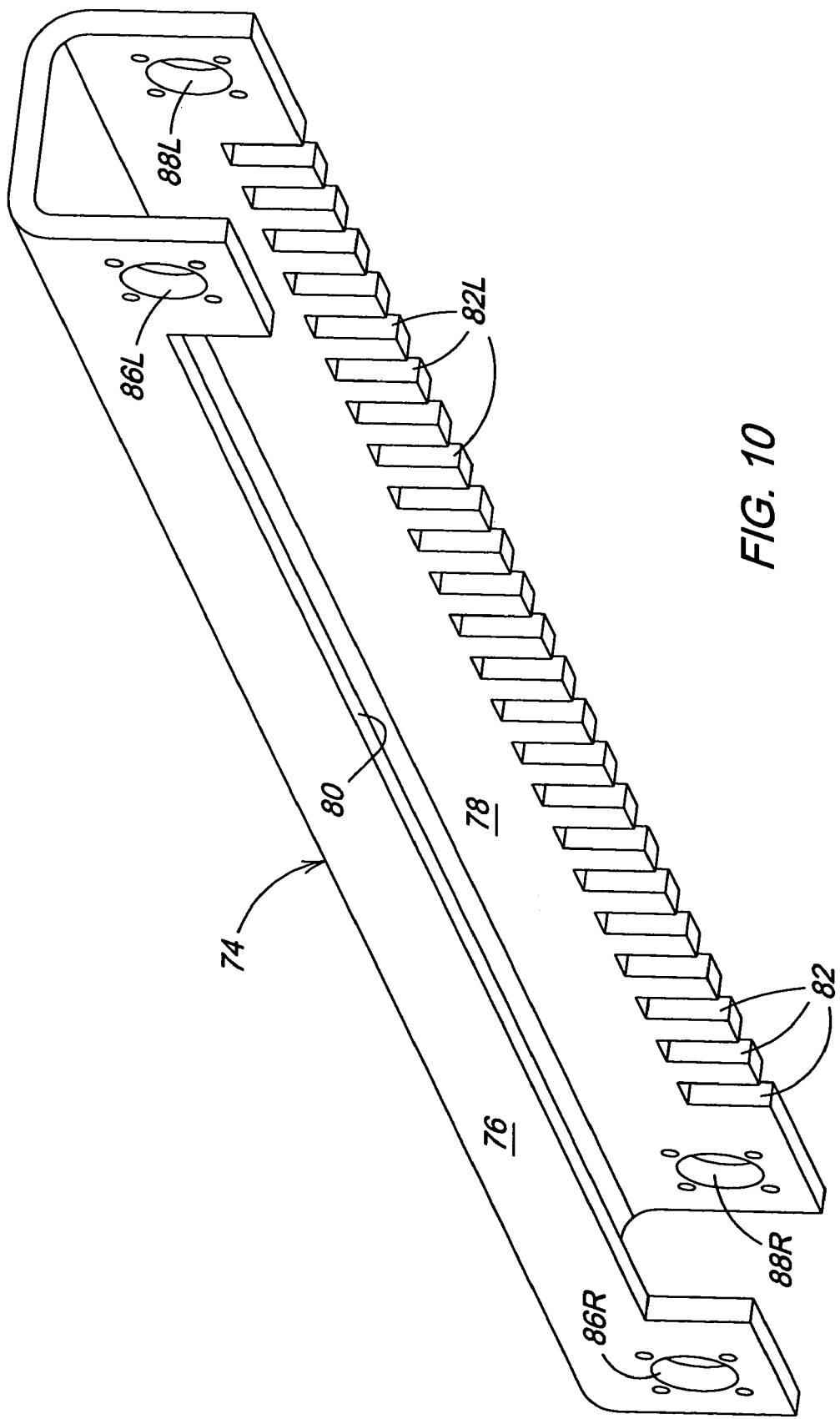
FIG. 10 is lower, left front perspective view of the cross member of the knife control mechanism.

A knife control mechanism 60 is provided for permitting an operator to remotely establish working or non-working conditions in the blades 26. The control mechanism 60 includes right- and left-hand, extensible and retractable hydraulic cylinders 62R and 62L. Provided for anchoring the piston end of each of the cylinders 62R and 62L to the frame 12 is an anchor structure including a horizontal, transverse cross member 64 extending between, and having opposite ends respectively fixed to, the side walls 14R and 14L at locations spaced rearwardly from the angle member 20. The cross member 64 is square in cross section and fixed to rear and bottom surfaces of right- and left-hand end regions of the cross member 64 are right- and left-hand pairs of transversely spaced plates 66R and 66L. The head end of the cylinder 62R is received between and pinned, as at 68, to the spaced pair of plates 66R. Similarly, the head end of the cylinder 62L is received between and pinned to the pair of plates 66L. Provided for transferring the motion of the piston rods of the cylinders 62R and 62L to the spring support rods 46 of the spring trip mechanism 36 is a cross member 74 defined by an inverted U-shaped channel member extending transversely between the side walls 14R and 14L and having front and rear legs 76 and 78, respectively. Referring also to FIG. 10, it can be seen that a clearance notch 80 is provided in a lower edge of the front leg 76 and extends across all except opposite end regions of the leg 76 so as to provide clearance for the spring support rods 46 and the springs 52. Guide notches 82 are provided across a bottom edge of the rear leg 78, and located in each notch 82 is one of the guide rods 46. Located in a rear end region of each spring support rod 46 is a rear roll pin 84 having a length greater than the width of the notches 82 so as to be in a path of rearward travel of the cross member 74, for a reason stated below. A pair of front apertures 86R and 86L are respectively provided in the front leg 76 at opposite end locations which are respectively in axial alignment with a pair of rear apertures 88R and 88L provided in the rear leg 78. Positioned within each of the apertures 86R, 86L, 88R, 88L is a bearing sleeve 90 having an enlarged head 92 located in engagement with an inner surface of the associated leg 76 or 78. Provided in each of the bearing sleeves 90 at a location adjacent an outer surface of the associated leg 76 or 78 is a keeper pin which cooperates with the head 92 so as to hold the bearing sleeve 90 in place in the associated leg. As can best be seen in FIG. 2, right- and left-hand guide rods 96R and 96L are respectively received in each pair of axially aligned bearing sleeves 90. The guide rod 96R has front and rear end portions respectively fixed within front and rear bracket assemblies and 98R and 100R that are in turn fixed to the support plate 38. Similarly, the guide rod 96L has front and rear end portions respectively fixed within front and rear bracket assemblies 98L and 100L that are in turn fixed to the support plate 38. Fixed to a right-hand end region of the cross member 74 are a transversely spaced pair of cylinder mounting plates 102R that are respectively in fore-and-aft alignment with the pair of plates 66R. A mounting pin 104R couples the rod end of the hydraulic cylinder 62R to the pair of mounting plates 102R. Similarly, a transversely spaced pair of cylinder mounting plates 102L are fixed to a left-hand end region of the cross member 74, and a mounting pin 104L couples the rod end of the hydraulic cylinder 62L to the pair of mounting plates 102L.

It will be appreciated then that a condition can be established wherein all of the knives 26 are permitted to assume non-working positions simply by placing the cylinders 62R and 62L in their extended condition, as illustrated in FIG. 3, or a condition wherein all of the knives are moved to their working positions by placing the cylinders 62R and 62L in their retracted condition, as illustrated in FIG. 4. In the latter situation, any knife which encounters an overload is protected by the safety trip mechanism 36 which permits the overloaded knife to move to the tripped position shown in FIG. 5.

A knife selecting arrangement 106 is provided for the purpose of blocking out certain knives 26 so that they remain in an inactive or non-working position even when the cylinders 62R and 62L are retracted. Referring now also to FIGS. 6–9, it can be seen that the knife selecting arrangement 106 is defined by a selector rotor 108 comprising a cylindrical tube 110 and stub shafts 112R and 112L respectively fixed to the opposite ends of the tube 110. The stub shafts 112R and 112L are of a smaller diameter than the tube 110 and are respectively received in clearance slots 114R and 114L provided in upper edges of the side walls 14R and 14L at locations spaced just to the rear of the angle member 20. Referring also to FIGS. 8 and 9, it can be seen that four different tab arrangements 116, 118, 120 and 122 are respectively fixed to the tube 110 in longitudinal rows spaced equally from each other about the longitudinal axis of the tube 110.

Figure 6:
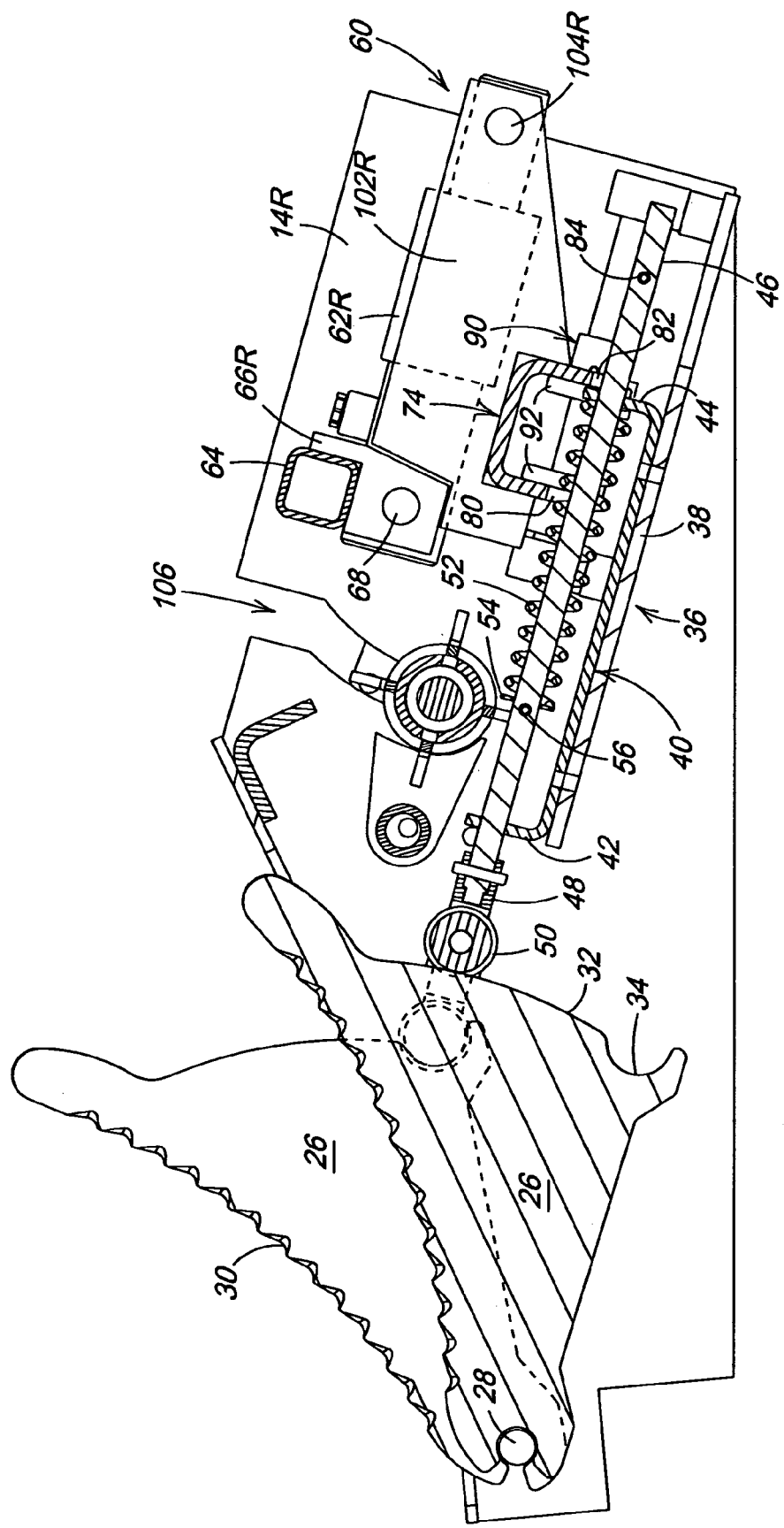
FIG. 6 is a view, like FIG. 5, but showing the knife-selector in a lowered position with the selector rotor indexed so as to block a pre-selected set of the illustrated trip mechanisms from returning their associated blades to active positions.

The tab arrangement 116 is designed for blocking all of the spring mounting rods 46 in the retracted position, as shown in FIG. 6, so that none of the knives 26 are operative for cutting crop. The tab arrangement includes a pair of tabs 124 respectively located at opposite extremes of the arrangement 116, and located between the tabs 124 and cooperating with the tabs 124 and with each other for defining a plurality of spaces 126 equal to the number of spring support rods 46 are a plurality of double-tabs 128. The spaces 126 are each dimensioned to permit one spring support rod 46 to pass through them but not the pin 84 carried by the rod 46.

The tab arrangement 118 is designed for blocking every other one of the spring mounting rods 46 in the retracted position shown in FIG. 6, beginning with the spring mounting rods 46 at the outer end. Since there are twenty-three knives 26 in the present embodiment, twelve are blocked and eleven remain operative for cutting crop. To accomplish this, the arrangement 118 includes a plurality of the tabs 124 spaced from each other so as to define spaces 126 at the opposite ends of the arrangement followed by double-spaces 130, with each of the double-spaces 130 being dimensioned for permitting one of the rods 46 and the pin 84 carried by it to pass through it.

The tab arrangement 120 is designed with a pattern similar to that of the tab arrangement 118 however the arrangement 120 is shortened so as not to block the outer rods 46 and is staggered relative to the arrangement 118 so as to block those rods not blocked by the arrangement 118. Thus, this results in an arrangement for blocking eleven knives 26 from operation while permitting twelve to be operative for cutting crop.

The tab arrangement 122 is designed with a pattern, beginning at the right-hand side of the safety trip mechanism 36, for blocking the first two spring support rods 46, leaving the next one free and then blocking the next two and so on until the left-hand end of the mechanism 36 is reached wherein the arrangement 122 is shortened so that only the next to the last cutting knife is blocked from operation. This is accomplished by starting with a tab 124 followed by a double-tab 128 and then another tab 124 followed by a double-space and then a repeat of the tab pattern until the right-hand end where two tabs 124 separated by a space 126 form the end of the tab arrangement 122. With this arrangement, fifteen knives 26 are blocked from operation, leaving eight operative for cutting crop.

It is to be understood that a selector mechanism 106 may be provided with rotors having any desired tab pattern for achieving a desired crop cutting characteristic with the cutting device 10.

Figure 7:
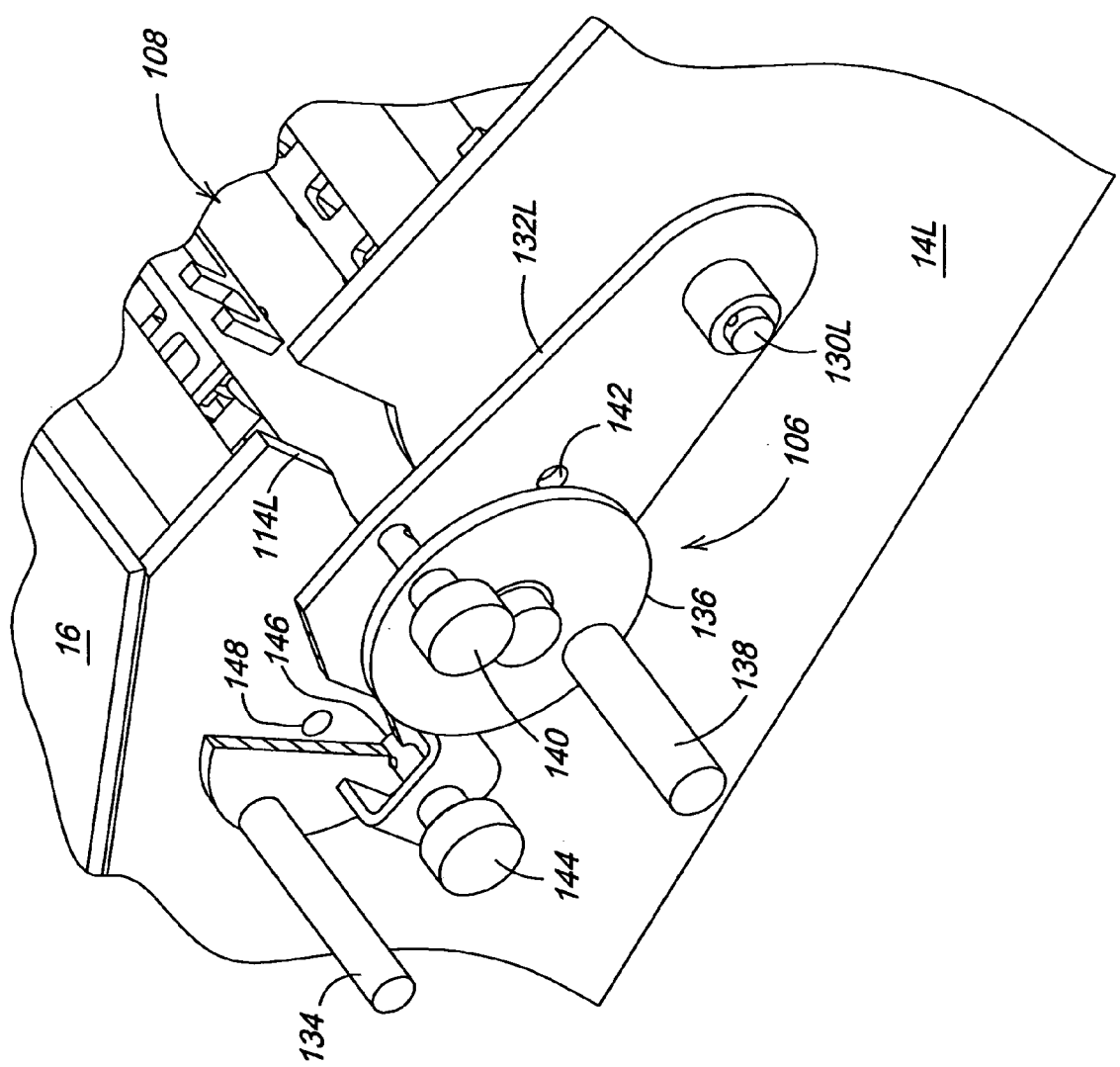
FIG. 7 is an enlarged left rear perspective view showing the adjustable mounting of the knife-selector.

The structure by which the tab arrangements 118–122 are selected and moved into operative association with the spring trip mechanism 36 will now be described. First, it is to be noted that the lower portions of the clearance slots 114R and 114L are formed at a radius about a horizontal, transverse axis defined by transverse mounting pins 130R and 130L that are secured within respective holes provided in the side walls 14R and 14L at locations just below rear regions of the hydraulic cylinders 62R and 62L. The mounting pins 130R and 130L respectively project outwardly from the side walls 14R and 14L and respectively mounted for pivoting vertically about the pins 130R and 130L are right- and left-hand, oval-shaped mounting plates 132R and 132L having respective rear ends mounted on the pins. Provided at the opposite end of the mounting plates 132R and 132L from the pins 130R and 130L are outwardly projecting handles, with only a handle 134 of the left-hand mounting plate 132L being shown. The mounting plates 132R and 132L have respective central regions in which the stub shafts 112R and 112L of the selector rotor 108 are mounted for rotation about a central axis of the rotor. Fixed to the outer ends of the stub shafts 112R and 112L are circular indexing discs, of which only the left-hand disc 136 is shown. A handle 138 is fixed to the disc 136 in a location diametrically opposite from a spring-loaded pin device 140 which locks the selector rotor 108 in a desired rotational position by being inserted in a selected one of four holes 142 provided in the mounting plate 132L at equally spaced locations about the longitudinal axis of the rotor 108. A further spring-loaded pin device 144 is mounted to a forward region of the mounting plate 132L and serves, when located in a lower hole 146 provided in the side wall 14L, to lock the selector device 106 in a lowered working position, as shown in FIGS. 6 and 7, and serves, when located in an upper hole 148 provided in the side wall 14L, to lock the selector device in a raised non-working position, as shown in FIGS. 3–5.

The operation of the selector mechanism 106 will now be described. Assuming that the selector mechanism 106 is in its lowered working position, shown in FIGS. 6 and 7, and that it is desired to change the number of active knives 26, it is first necessary for all of the knives 26 to be placed in their lowered, inactive positions. This is accomplished by actuating the knife control cylinders 62R and 62L to their extended positions, shown in FIG. 3. Extension of the cylinders 62R and 62L causes the cross member 74 to be moved to the rear resulting in the pins 84 being engaged and the spring support rods 46 being shifted to the rear against the bias of the springs 52 so as to remove the rollers 50 from the recesses 34 in the active knives 26 so as to permit the latter to fall to their inoperative positions, shown in FIG. 3. The pins 56, respectively associated with any spring mounting rod 46 that had previously been blocked by the selected tab arrangement, are then free of the selector rotor 108. The selector rotor 108 is then raised to its inoperative position (see FIG. 3) by first releasing the spring loaded pin 144 from the lower hole 146, the pin 144 then being inserted into the upper hole 148 for retaining the rotor 148 in its raised position. A new tab arrangement can then be selected by pulling the pin 140 and rotating the disc 136 by grasping the handle 138 so as to place the desired tab arrangement at the bottom of the rotor 108. The pin 140 will then be aligned with one of the holes 142 and will be inserted into it so as to lock the rotor 108 in place. The plate 132L is then unlocked from its raised position and lowered so that the tabs of the selected tab arrangement are located ahead of the pins 56 of those spring mounting rods 46 that are to be blocked from operation. The knives associated with the unblocked spring mounting rods 46 are then moved to their active positions by actuating the cylinders 62R and 62L so they retract to establish the condition illustrated in FIG. 6 wherein the blocked mounting rods 46 remain in their rearward positions while the remaining rods 46 are shifted forwardly by the springs 52 and cause the selected knives 26 to be pivoted upwardly to their active positions.

Having described the preferred embodiment, it will become apparent that various modifications can be made without departing from the scope of the invention as defined in the accompanying claims.

What is claimed is:

1. In a crop cutting device including a support frame having opposite side walls, a knife bed extending between the side walls and provided with a plurality of parallel, elongate slots extending in a direction of travel of the cutting bed, a plurality of knives mounted beneath said knife bed respectively in vertical alignment with said elongate slots and for pivoting vertically between a lowered non-working position, wherein cutting edges of said knives are located substantially at said elongate slots, and a raised working position, wherein said cutting edges project substantially entirely above said knife bed, a safety trip device associated with each knife and including resiliently yieldable member movable between an extended position, wherein it retains an associated knife in its working position, and a yielded retracted position wherein said associated knife is permitted to move to its non-working position, and a selector mechanism for selectively blocking certain safety trip devices in their retracted positions, the improvement comprising: said selector mechanism including a rotatably mounted rotor extending adjacent said safety trip devices and having at least two different selector arrangements which are selectively movable into positions for blocking different numbers of said safety trip devices in their respective retracted positions.

2. The cutting device, as defined in claim 1, and further including a powered mechanism for moving all of said safety trip devices to their retracted position prior to said selector mechanism being operated to selectively block pre-selected ones of said safety trip devices in their retracted positions.

3. The cutting device, as defined in claim 1, and further including a powered mechanism operatively coupled to said plurality of safety trip devices for moving all of said safety trip devices, except those blocked by said selector mechanism, to their extended positions.

4. The cutting device, as defined in claim 1, wherein said rotor is mounted for movement to a non-use position spaced away from said safety trip devices, to thereby permit all of said safety trip devices to move between their extended and retracted positions.

5. The cutting device, as defined in claim 1, wherein said safety trip devices each include an elongate rod having an abutment located along its length; and said selector arrangements each being defined by selector tabs which are located for engaging the abutment of selected ones of said safety devices so as to prevent movement of the elongate rod.

* * * * *